United States Patent [19]

Kim

[11] Patent Number: 5,818,885
[45] Date of Patent: Oct. 6, 1998

[54] METHOD FOR MINIMIZING TIME TO ESTABLISH INITIAL SYNCHRONIZATION BETWEEN A MOBILE STATION AND A BASE STATION IN A MOBILE COMMUNICATION SYSTEM

[75] Inventor: Sang-Geun Kim, Kyungki-do, Rep. of Korea

[73] Assignee: SamSung Electronics Co., Ltd., Suwon, Rep. of Korea

[21] Appl. No.: 664,912

[22] Filed: Jun. 17, 1996

[30] Foreign Application Priority Data

Jun. 16, 1995 [KR] Rep. of Korea ................. 1995/16003

[51] Int. Cl.$^6$ ................................................ H04L 7/00
[52] U.S. Cl. .......................... 375/354; 375/202; 375/200; 375/367
[58] Field of Search ........................ 375/354, 367, 375/202, 200, 206

[56] References Cited

U.S. PATENT DOCUMENTS

| | | |
|---|---|---|
| 4,367,558 | 1/1983 | Gercekci et al. . |
| 4,442,527 | 4/1984 | Munday ....................................... 375/1 |
| 4,454,604 | 6/1984 | Myers ......................................... 375/1 |
| 4,558,453 | 12/1985 | Mimkea ....................................... 375/1 |
| 4,677,617 | 6/1987 | O'Connor et al. ....................... 370/100 |
| 4,752,939 | 6/1988 | Amuroso et al. ........................... 375/1 |
| 4,998,290 | 3/1991 | Olenick et al. . |
| 5,121,408 | 6/1992 | Cai et al. . |
| 5,270,669 | 12/1993 | Jokura . |
| 5,343,497 | 8/1994 | Canosi et al. . |
| 5,355,522 | 10/1994 | Demange . |
| 5,361,401 | 11/1994 | Pirillo . |
| 5,390,216 | 2/1995 | Bilitza et al. . |
| 5,408,504 | 4/1995 | Ostman . |
| 5,428,637 | 6/1995 | Oliva, Jr. et al. ....................... 375/202 |
| 5,509,027 | 4/1996 | Vook et al. .............................. 375/202 |
| 5,519,717 | 5/1996 | Lorenzo et al. . |
| 5,546,422 | 8/1996 | Yokev et al. ............................ 375/202 |
| 5,550,873 | 8/1996 | Dolev et al. ............................ 375/354 |
| 5,568,510 | 10/1996 | Tam ........................................ 375/202 |
| 5,619,503 | 4/1997 | Dent ....................................... 370/330 |

*Primary Examiner*—Stephen Chin
*Assistant Examiner*—Mohammad Ghayour
*Attorney, Agent, or Firm*—Robert E. Bushnell, Esq.

[57] ABSTRACT

A frequency using method for minimizing a time for an initial synchronization between a mobile station and a base station in a mobile telecommunication system. The frequency using method includes the steps of inputting current time data; reading out an initial synchronization frequency from an internal memory; determining an initial synchronization hopping frequency and an initial synchronization hopping cycle according to a hopping pattern polynomial and the current time data; and sequentially searching for frequencies within a communication channel on a one-by-one basis according to the initial synchronization hopping frequency and the initial synchronization hopping cycle to produce a synchronized frequency to establish synchronization between the mobile station and the base station.

4 Claims, 4 Drawing Sheets

METHOD FOR MINIMIZING TIME TO ESTABLISH INITIAL SYNCHRONIZATION BETWEEN A MOBILE STATION AND A BASE STATION IN A MOBILE COMMUNICATION SYSTEM

CROSS-REFERENCE TO RELATED APPLICATION

This application makes reference to, incorporates the same herein, and claims all benefits accruing under 35 U.S.C. §119 from an application for *Method For Minimizing Time To Establish Initial Synchronization Between A Mobile Station And A Base Station In A Mobile Communication System* earlier filed in the Korean Industrial Property Office on 16 Jun. 1995, and there duly assigned Ser. No. 16003/ 1995.

BACKGROUND OF THE INVENTION

1. Technical Field

The present invention relates to a method for establishing synchronization between a mobile station and a base station in a mobile communication system, and more particularly to a frequency using method for minimizing the time to establish initial synchronization between a mobile station and a base station.

2. Background Art

Modern mobile communication systems such as disclosed in U.S. Pat. No. 4,998,290 for *Frequency-Hopping Radio Communication Network* issued to Olenick et al., in which a plurality of communication units such as a mobile station and a base station communicate with each other over a wide band of frequencies within a single communication channel, are commonly known to utilize frequency hopping spread spectrum waveforms to achieve a high degree of protection from frequency jamming as well as protection from eavesdropping on the communication channels. In such a frequency hopping system, the carrier frequency shifts from frequency to frequency in a predetermined pseudo-random pattern through the spectrum of the communication channel. The pseudo-random frequency pattern is conventionally locked to the system clock or timing since frequency hopping is essentially a time-frequency coded technique. The system clock is established when the local clocks of all the communication units communicating on the channel are substantially synchronized to the same time. Without this local clock synchronization, the communication units communicating on the channel will not hop to next frequency at the same time, and thus will lose communication with each other. As a result, all communication units in the frequency hopping system must have the same timing, and each communication unit must initially synchronized with the rapid frequency hopping code of the system in order to communication with the system.

Conventional synchronization techniques for a mobile communication system such as disclosed in U.S. Pat. No. 5,343,497 for *Method For The Synchronization Between A Base Station And A Mobile Radio Station In A Digital Radiomobile System* issued to Canosi et al., and U.S. Pat. No. 5,355,522 for *Frequency Selection Method And Apparatus* issued to Demange, use preambles known to a receiving station to achieve synchronization with a transmitted signal. However, these conventional techniques use parallel processing of multiple channels.

Another method of establishing synchronization between communication units communicating on the channel is disclosed, for example, in U.S. Pat. No. 5,121,408 for *Synchronization For Entry To A Network In A Frequency Hopping Communication System* issued to Cai et al., and U.S. Pat. No. 5,408,504 for *Symbol and Frame Synchronization In A TDMA System* issued to Ostman. In Cai et al. '408 and Ostman '504, a synchronization arrangement in which each communication unit on the network is initially synchronized to the same time without relying upon a synchronization preamble. Synchronization is facilitated by embedding synchronization codes in the frequency hopping sequence. Once synchronization is established, each communication unit continually tracks its local clock deviation from that of the system time, making any corrections necessary to maintain synchronization between its local clock and the system clock. Many of these conventional synchronization techniques, as I have observed however, synchronization is established only after all frequency bands are fully scanned. This results in an unfortunate delay in the synchronization between communication units.

SUMMARY OF THE INVENTION

Accordingly, it is therefore an object of the present invention to provide an improved mobile communication system.

It is another object to provide a device and method for minimizing the time to establish initial synchronization between a mobile station and a base station in a mobile communication system.

These and other objects of the present invention can be achieved by a frequency using method for performing an initial synchronization between a mobile station and a base station in a mobile telecommunication system. The frequency using method includes the steps of inputting current time data; reading out an initial synchronization frequency from an internal memory; determining an initial synchronization hopping frequency and an initial synchronization hopping cycle according to a hopping pattern polynomial and the current time data; and sequentially searching for frequencies within a communication channel on a one-by-one basis according to the initial synchronization hopping frequency and the initial synchronization hopping cycle to produce a synchronized frequency to establish synchronization between the mobile station and the base station.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
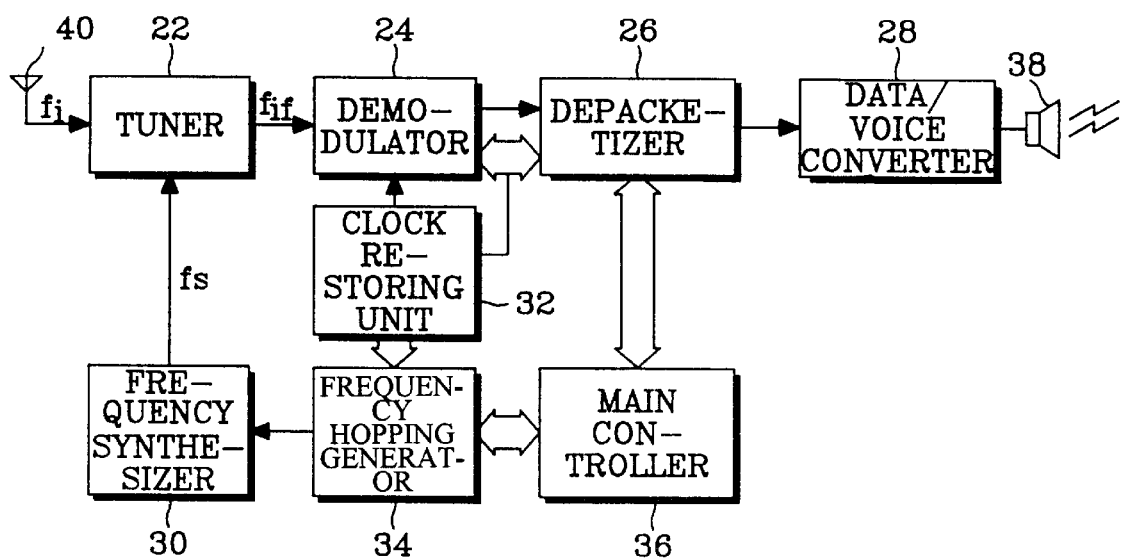
FIG. 1 illustrates a construction of one of a base station and a mobile station in a mobile communication system according to the principles of the present invention.

Referring now to the drawings and particularly to FIG. 1, which illustrates a construction of a mobile station in a mobile communication system according to the principles of the present invention. The mobile station as shown in FIG. 1 includes a tuner 22, a demodulator 24, a depacketizer 26, a data/voice converter 28, a frequency synthesizer 30, a clock restoring unit 32, a frequency hopping generator 34, a main controller 36, a speaker 38 and an antenna 40.

An antenna 40 which is coupled to a tuner 22 picks up a radio frequency signal $f_i$ transmitted from a base station. The tuner 22 selectively filters an intermediate frequency signal $f_{if}$ from the radio frequency signal $f_i$ received through an antenna 40 according to a control signal. The demodulator 24 then demodulates the intermediate frequency signal $f_{if}$ and generates a demodulated signal. Upon the reception of the radio frequency signal $f_i$ transmitted from the base station, the main controller 36 reads out a hopping frequency from an internal read-only-memory (ROM) at every a hopping cycle in order to generate a hopping control signal. A frequency hopping generator 34 generates a certain frequency hopping pattern in response to the hopping control signal. A frequency synthesizer 30 then generates a tuning control signal $f_s$ having a local frequency corresponding to a difference between an input and an output frequencies of the tuner 22, in response to the frequency hopping pattern generated from the frequency hopping generator 34. A clock restoring unit 32 is used to tune the output of the demodulator 24 in response to an internal clock. A depacketizer 26 is connected to the demodulator 24 for removing a preamble and a postamble from data tuned to the internal clock, and determining a frame synchronization pattern according to the types of frame transmitted from the base station in order to generate source data. A data/voice converter 28 is connected to the depacketizer 26 for converting the source data output from the depacketizer 26 into an audible state via a speaker 38 for communication.

Figure 2:
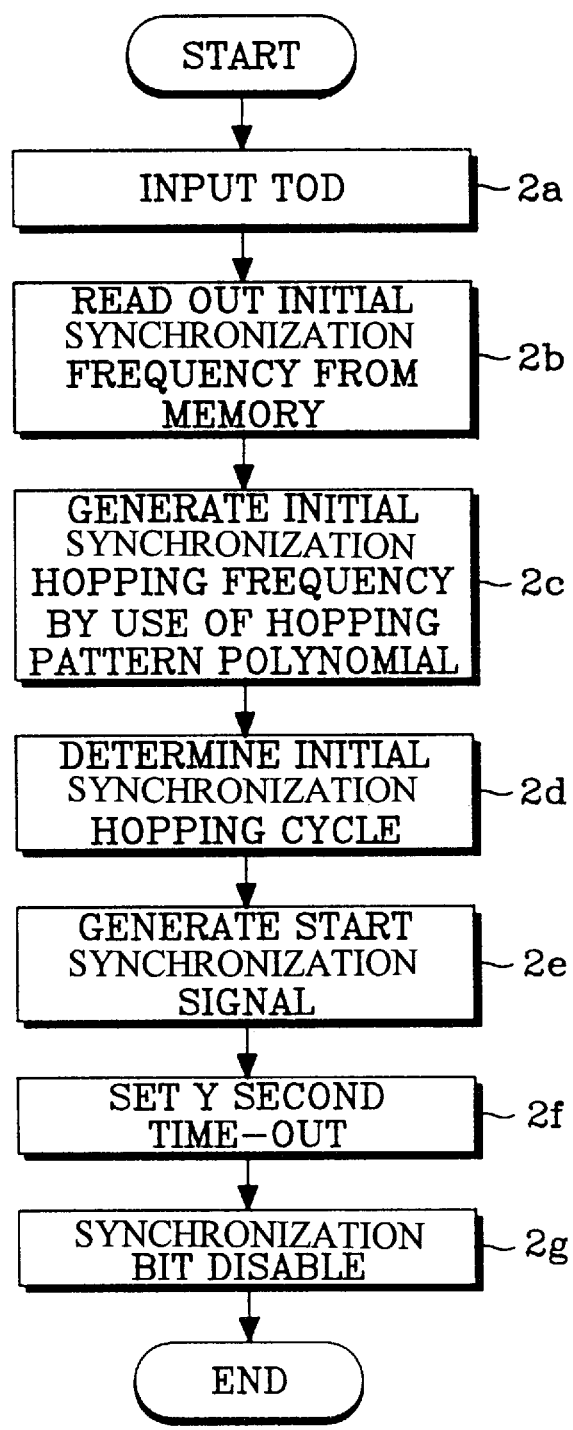
FIG. 2 is a flow chart illustrating a process of establishing initial synchronization of a mobile station with a base station in a mobile communication system according to the present invention.

Turning now to FIG. 2 which is a flow chart illustrating a process of establishing initial synchronization between a mobile station and a base station according to one embodiment of the present invention. In step 2a, the main controller 36 first inputs a time of date (TOD) provided by an operator. In step 2b, the main controller 36 reads out a usable initial synchronization frequency information previously stored in its internal memory. The usable initial synchronization frequency information is commonly shared by the base station and the mobile station. In step 2c, the main controller 36 generates an initial synchronization hopping frequency in dependence upon the known hopping pattern polynomial and the TOD. Once the initial hopping frequency is generated, the main controller 36 determines the initial synchronization hopping cycle at step 2d. At this time, if the initial synchronization hopping cycle is determined, the main controller 36 generates and outputs a search start synchronization signal in step 2e in order to begin to sequentially search the initial synchronization hopping frequency generated in step 2c. Once the start synchronization signal is generated, the main controller 36 also sets a time-out of a unit time (for example, 100 msec) at step 2f in its application software routine so that one frequency within a communication channel can be searched during each unit time set. At the same time, in step 2g, a software synchronization bit is disabled indicating that the synchronization between the mobile station and the base station has been initialized for searching for the next frequency.

Figure 3:
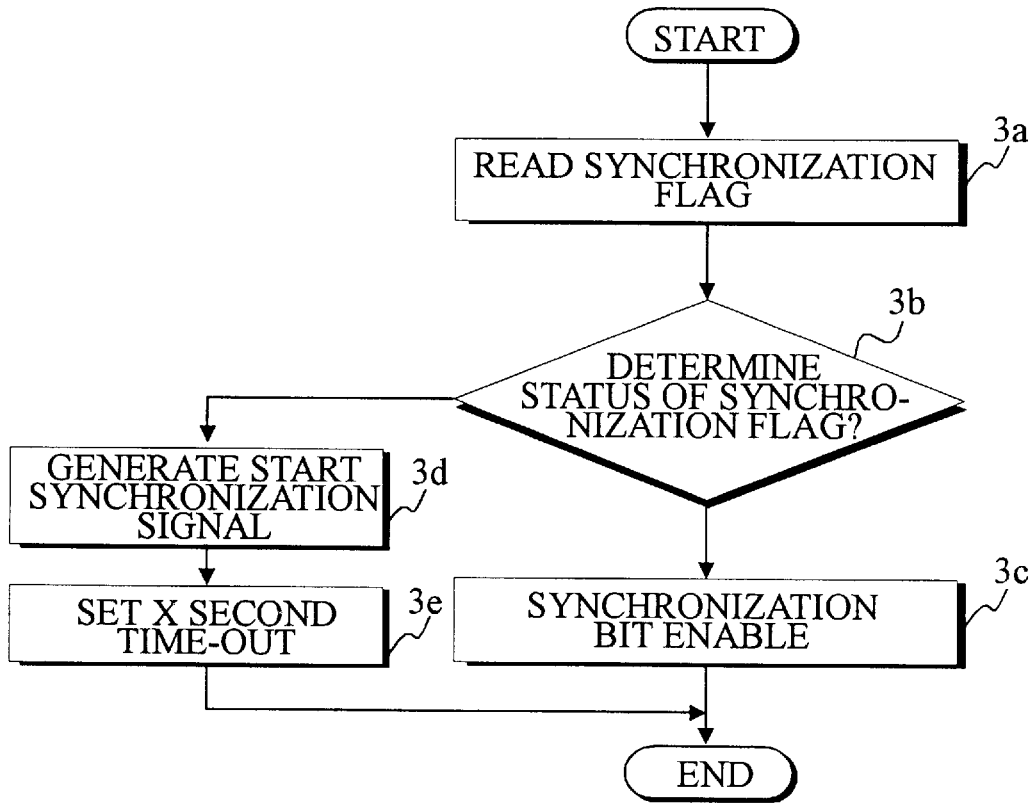
FIG. 3 is a flow chart illustrating a process of setting an initial synchronization frequency and checking whether initial synchronization is established in the mobile station.

FIG. 3 is a flow chart illustrating a process of setting an initial synchronization frequency and checking whether synchronization is established in the mobile station. According to the time for this procedure which is set, for example, 100 msec. The process of setting an initial synchronization frequency is described as follows. In step 3a, the main controller 36 reads out a synchronization flag from its hardware component. The main controller 36 then determines the status of the synchronization flag at step 3b, i.e., whether such a synchronization flag represents a logical "1" or a logical "0" in order to initiate synchronization between the mobile station and the base station. When the synchronization flag represents a logical "0", that is, when the initial synchronization is not performed, the main controller 36 generates a search start synchronization signal to search for a next frequency at step 3d, and then sets a certain time-out for searching fro the next frequency at step 3e. When the synchronization flag represents a logical "1" however, a software synchronization bit is enabled at step 3c.

Refer back now to FIG. 3 where a process of establishing initial synchronization of a mobile station with a base station in a mobile communication system among a plurality of usable frequencies over all bands is described with reference to FIG. 2 as follows.

First, a predetermined number of usable initial synchronization frequencies are selected and the selected usable initial synchronization frequencies are sequentially arranged by an algorithm, so that identical information is stored in internal read-only-memories (ROMs) of the base station and each mobile station.

Second, according to a mobile communication system formed by respective mobile radio connectors, there can be a specific unusable frequency field due to a variableness and a regional characteristic under the poor radio environment, even though the initial synchronization frequency is primarily selected by excluding the specific unusable frequency field for other objects. Such specific unusable frequencies different from one another in every respective communication systems should be also excluded from communication within the system. Therefore, if the initial synchronization frequency unusable in the communication system is downloaded to a control information packet transmitted from respective base stations, the mobile station receives the downloaded initial synchronization frequency and maintains the initial synchronization of the initial synchronization frequency excepting for the unusable frequency by a series of algorithms.

As discussed above, the base station combines the selected initial synchronization frequencies in one equation, and performs the frequency hopping in frequency group except for the unusable frequency defined within each frequency field in order to transmit the control packet and an unusable frequency packet. In this case, the mobile station entering into a concerned network can not identify an existing hopping frequency and a frequency hopping pattern of the concerned network. Such initial synchronization frequency hopping pattern is commonly provided with respective equipments. The initial synchronization frequency must be read out from an internal memory device such as a read-only-memory (ROM) of the equipments, so that the initial synchronization frequency group is rearranged by the frequency hopping pattern. One cycle of, for example, eight (8) initial synchronization frequencies among all initial synchronization frequencies is selected every respective networks, and a frequency hopping is cyclically performed within one cycle of 8 initial synchronization frequencies in order to specify the concerned network. In this particular instance, since synchronization detection of the mobile station is time consuming and is difficult, the concept of a Time of Data (TOD) which represents a current time and is an index for representing the cycle of the initial synchronization frequency which is utilized in the base station constructing the existing network. Such TOD value is input to the mobile station by an operator through a man machine communication MMC. The mobile station selects the frequency searched by the TOD value, fixes the selected frequency as a reception frequency and synchronizes in accordance with such a reception frequency. However, such TOD information can be considerably different in comparison with the TOD reference value of the concerned base station. In this case, because synchronization is not consistent with each other, the scanning should be again performed. At this time, it is not desirable to scan the frequency of all bands. So, after the TOD value is input to the mobile station, the mobile station is set to a first frequency according to the input TOD value during a predetermined time period longer than a receiving and transmitting time used for one cycle of the initial synchronization frequency by software of a search starting request. As a result, the mobile station is synchronized.

If the predetermined time period is expressed as 'Xsync', in the case of not being synchronized, a next frequency is searched during the time period of Xsync. At this time, the next frequency should be selected and searched during the same constant interval of the initial synchronization frequency in consideration of the TOD value input by an operator. In this way, within one partial cycle (8 frequencies) and the TOD value transmitted from the base station, the synchronization can be performed and the scanning time required for scanning of all frequencies can be reduced.

Figure 4:
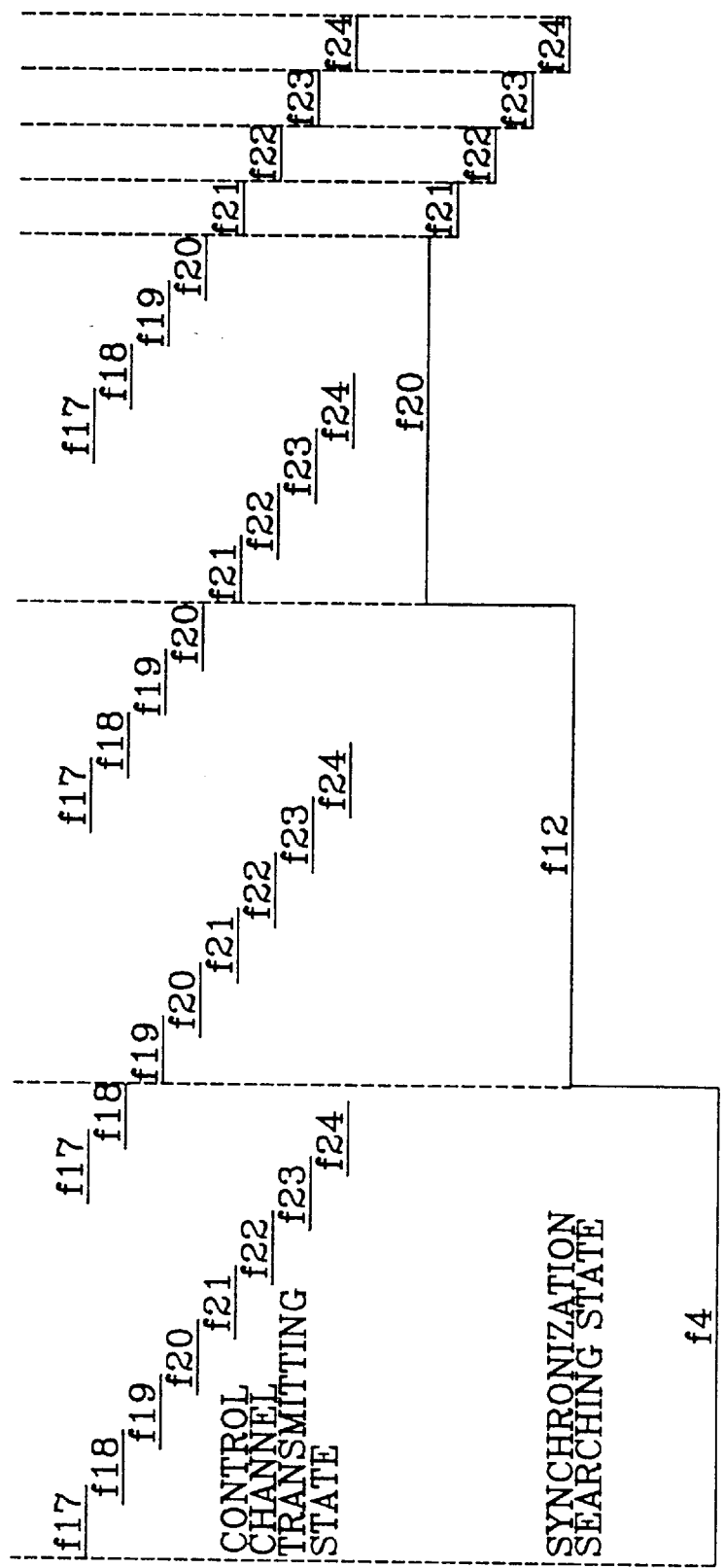
FIG. 4 is a view illustrating a process of how the mobile station establishes initial synchronization with a local initial synchronization frequency transmitted from the base station.

Turning now to FIG. 4 which illustrates a process of how the mobile station synchronizes with a local initial synchronization frequency transmitted from the base station. In this embodiment, it is assumed that the number of the local initial synchronization frequencies (f17 to f24) transmitted from the base station is eight (8). In addition, the TOD input to the mobile station by the operator is not exact so that synchronization can not be performed. In other words, since the TOD is not exact, the search frequency can not be exactly selected in the mobile station. Thus, as illustrated in one example, the synchronization is performed at the frequencies f4, f12 and f20. Further describing, even though the synchronization is tried to the first frequency f4 in the mobile station, the synchronization is not performed to any frequency of the frequencies transmitted from the base station. At this time, since it is considered that the TOD is not exactly input by the operator is considered, the search time corresponds to 10 local time initial synchronization frequencies longer than 8 local initial synchronization frequencies (f17 to f24). Also, the synchronization is not performed to the second frequency f12. However, since the frequency f20 is included in 8 local initial synchronization frequencies (f17 to f24), the synchronization is performed to the third frequency f20. As discussed above, once the synchronization is performed, the synchronization is continuously performed from that time.

As discussed above, there is an advantage in which the initial synchronization frequencies are selected, combined and hopped as the specific frequencies within a short time at the time of the synchronization detection of the mobile station, thereby to minimize the time for establishing the synchronization between the mobile station and the base station in a mobile communication system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A frequency using method for establishing initial synchronization between a mobile station and a base station in a mobile communication system, said method comprising the steps of:

inputting current time data;

reading out an initial synchronization frequency from an internal memory;

determining an initial synchronization hopping frequency and an initial synchronization hopping cycle according to a hopping pattern polynomial and said current time data; and sequentially searching for frequencies within a communication channel on a one-by-one basis according to said initial synchronization hopping frequency and said initial synchronization hopping cycle to produce a synchronized frequency to establish synchronization between the mobile station and the base station.

2. A frequency using method for minimizing a time for an initial synchronization between a base station and a mobile station in a mobile telecommunication system, comprising the steps of:

inputting to the mobile station index information indicating a cycle of an initial synchronization frequency which is used in said base station constructing a network;

reading out said initial synchronization frequency from a memory;

generating an initial synchronization hopping frequency in dependence upon a hopping pattern polynomial;

determining an initial synchronization hopping cycle;

generating a start synchronization signal;

setting a time-out for a certain time;

disabling a synchronization bit; and generating a timer interrupt every a predetermined time interval while performing all above steps sequentially, to determine whether initial synchronization has been established between the mobile station and the base station.

3. A mobile station of a mobile communication system including a base station, comprising:

tuner means for selectively filtering an intermediate frequency signal from a radio frequency signal received from said base station in dependence upon to a control signal;

demodulator means for demodulating the intermediate frequency signal to generate a demodulated signal;

controller means for reading out a hopping frequency from a memory at every a hopping cycle to generate a hopping control signal;

frequency hopping generator means generates a certain frequency hopping pattern in response to the hopping control signal;

frequency synthesizer means for generating a tuning control signal having a local frequency corresponding to a difference between an input and an output frequencies of said tuner means, in response to the frequency hopping pattern generated from said frequency hopping generator means;

clock restoring means for tuning the output of said demodulator means in response to an internal clock;

depacketizer means connected to said demodulator means, for removing a preamble and a postamble from data tuned to the internal clock, and determining a frame synchronization pattern according to the types of frame data transmitted from the base station to generate source data; and data/voice converter means connected to the depacketizer means, for converting the source data output from said depacketizer means into an audible state for communication.

4. The mobile station of claim 3, further comprised of said controller means establishing initial synchronization with the base station by the steps of:

receiving current time data input by an operator;

reading out an initial synchronization frequency from said memory;

determining an initial synchronization hopping frequency and an initial synchronization hopping cycle according to a hopping pattern polynomial and said current time data; and sequentially searching for frequencies within a communication channel on a one-by-one basis according to said initial synchronization hopping frequency and said initial synchronization hopping cycle to produce a synchronized frequency to establish synchronization between the mobile station and the base station.

* * * * *